United States Patent
Anderson

(10) Patent No.: US 10,975,702 B2
(45) Date of Patent: Apr. 13, 2021

(54) PLATFORM COOLING ARRANGEMENT FOR A GAS TURBINE ENGINE

(71) Applicant: UNITED TECHNOLOGIES CORPORATION, Farmington, CT (US)

(72) Inventor: Corey D. Anderson, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 88 days.

(21) Appl. No.: 16/008,521

(22) Filed: Jun. 14, 2018

(65) Prior Publication Data

US 2019/0383146 A1    Dec. 19, 2019

(51) Int. Cl.
  *F01D 5/18* (2006.01)
  *F01D 25/12* (2006.01)
  *F01D 9/06* (2006.01)

(52) U.S. Cl.
  CPC ............. *F01D 5/186* (2013.01); *F01D 9/065* (2013.01); *F01D 25/12* (2013.01); *F05D 2220/32* (2013.01); *F05D 2240/81* (2013.01)

(58) Field of Classification Search
  CPC .......... F01D 5/186; F01D 5/187; F01D 5/188; F01D 5/189; F01D 9/06; F01D 9/065; F05D 2240/81
  See application file for complete search history.

(56) References Cited

U.S. PATENT DOCUMENTS

| | | | |
|---|---|---|---|
| 3,527,543 A * | 9/1970 | Howald | F01D 5/186 416/90 R |
| 5,320,485 A * | 6/1994 | Bourguignon | F01D 5/187 415/115 |
| 6,984,101 B2 | 1/2006 | Schiavo, Jr. | |
| 8,011,881 B1 | 9/2011 | Liang | |
| 8,632,298 B1 | 1/2014 | Liang | |
| 9,222,364 B2 | 12/2015 | Papple et al. | |
| 9,683,444 B1 | 6/2017 | Jones | |
| 2016/0190157 A1 | 6/2016 | Tang | |
| 2017/0044915 A1 * | 2/2017 | Mugglestone | F01D 9/065 |
| 2017/0234218 A1 | 8/2017 | Cupini et al. | |

FOREIGN PATENT DOCUMENTS

EP        3124744 A1    2/2017

OTHER PUBLICATIONS

Partial European Search Report for Application No. EP 19 18 0401; dated Nov. 4, 2020.

* cited by examiner

*Primary Examiner* — Courtney D Heinle
*Assistant Examiner* — Michael K. Reitz
(74) *Attorney, Agent, or Firm* — Cantor Colburn LLP

(57) ABSTRACT

A turbine vane includes a platform, an airfoil, and a cooling arrangement. The platform has a first surface and a second surface. The first surface and the second surface each axially between a first platform end and a second platform end and each circumferentially extend between a first platform side and a second platform side. The airfoil is connected to the platform and defines a passage outlet that extends through the second surface. The cooling arrangement includes a third wall that is connected to the second surface of the platform. The third wall defines a first outlet and a second outlet.

19 Claims, 5 Drawing Sheets

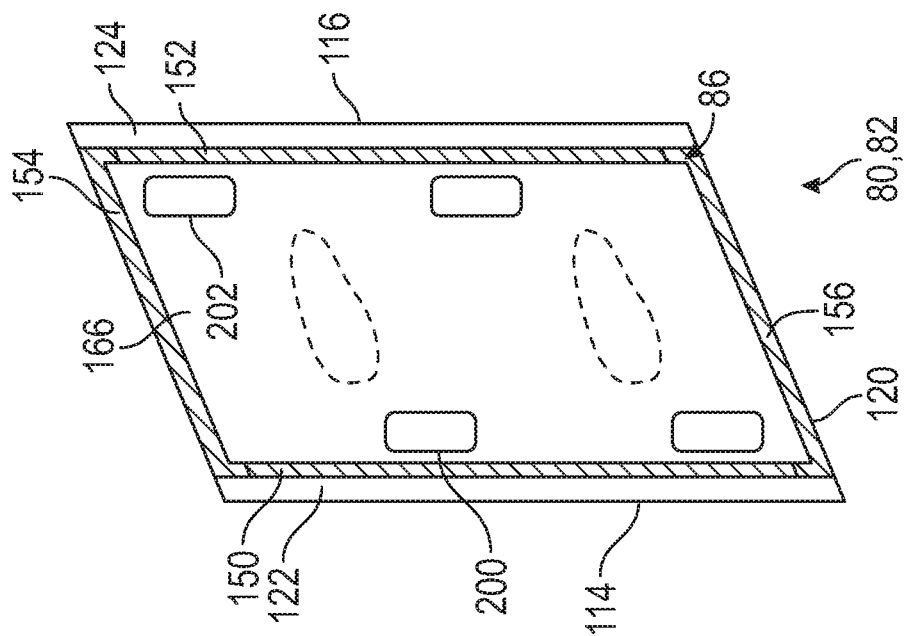
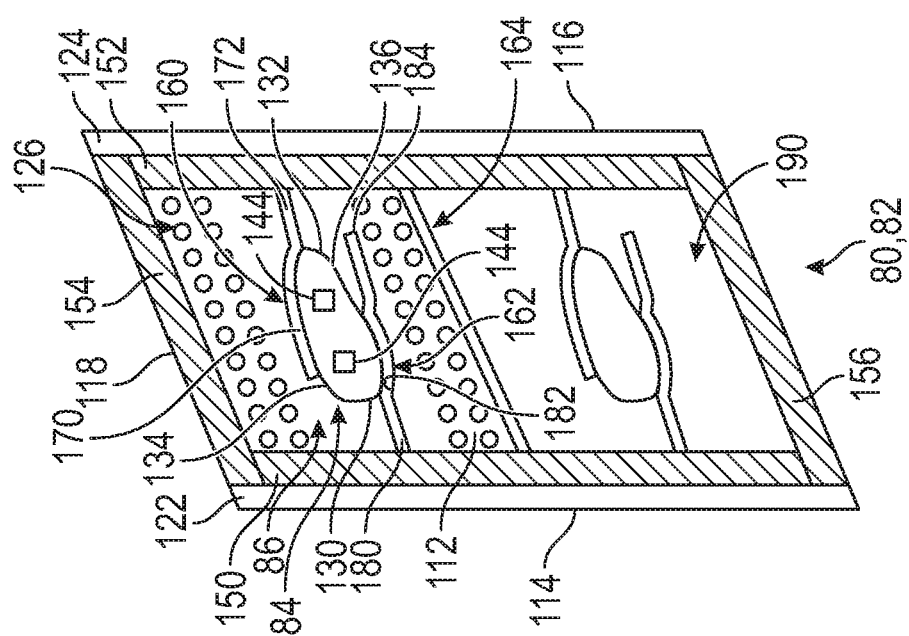

PLATFORM COOLING ARRANGEMENT FOR A GAS TURBINE ENGINE

BACKGROUND

Exemplary embodiments of the present disclosure pertain to the art of cooling arrangements for platforms of a gas turbine engine.

A gas turbine engine may be provided with vanes that extend into a core flow path of the gas turbine engine. The vanes generally guide airflow towards a downstream component. The vane may be provided with cooling features to cool the vane.

BRIEF DESCRIPTION

Disclosed is a vane for a gas turbine engine. The vane includes a first platform and a second platform, and a cooling arrangement. The platforms are joined together by an airfoil that defines a flow passage that extends between the first platform and the second platform. At least one of the first platform and the second platform includes a first surface and a second surface that is disposed opposite the first surface. The flow passage defines a passage outlet that extends through the second surface. The cooling arrangement includes a first wall, a second wall, and a third wall. The first wall is disposed on the second surface. The second wall second surface is spaced apart from the first wall and is disposed on the second surface. The third wall is connected to the second surface to define a flow cavity therebetween. The third wall defines a first outlet. The third wall, the first wall, and the second wall at least partially define a first flow passage that extends between the passage outlet and the first outlet.

In addition to one or more of the features described above, or as an alternative to any of the foregoing embodiments, an airflow flows through the flow passage of the airfoil, enters the first flow passage, and exits through the first outlet.

In addition to one or more of the features described above, or as an alternative to any of the foregoing embodiments, the third wall is integrally formed with at least one of the first platform and the second platform.

In addition to one or more of the features described above, or as an alternative to any of the foregoing embodiments, the third wall defines a second outlet.

In addition to one or more of the features described above, or as an alternative to any of the foregoing embodiments, a plurality of film cooling holes extend from the second surface to the first surface.

In addition to one or more of the features described above, or as an alternative to any of the foregoing embodiments, the plurality of film cooling holes are fed by the flow cavity.

In addition to one or more of the features described above, or as an alternative to any of the foregoing embodiments, the third wall, the first wall, and the rail at least partially define a second flow passage that extends between the passage outlet and the second outlet.

In addition to one or more of the features described above, or as an alternative to any of the foregoing embodiments, a heat transfer enhancement feature is disposed on the second surface.

Also disclosed is a vane for a gas turbine engine. The vane includes a platform, an airfoil, and a cooling arrangement. The platform has a first surface and a second surface. The first surface and the second surface each axially between a first platform end and a second platform end and each circumferentially extend between a first platform side and a second platform side. The airfoil is connected to the platform and defines a passage outlet that extends through the second surface. The cooling arrangement includes a third wall that is connected to the second surface of the platform. The third wall defines a first outlet and a second outlet.

In addition to one or more of the features described above, or as an alternative to any of the foregoing embodiments, a flow cavity is defined between the third wall and the second surface.

In addition to one or more of the features described above, or as an alternative to any of the foregoing embodiments, the third wall is disposed on a rail that extends from the second surface.

In addition to one or more of the features described above, or as an alternative to any of the foregoing embodiments, the cooling arrangement includes a first wall disposed on the second surface and disposed proximate a pressure side of the airfoil; and a second wall disposed on the second surface and disposed proximate a suction side of the airfoil.

In addition to one or more of the features described above, or as an alternative to any of the foregoing embodiments, the cooling arrangement includes a divider wall that is disposed on the second surface and extends between first platform end and the second platform end.

In addition to one or more of the features described above, or as an alternative to any of the foregoing embodiments, the third wall, the first wall, and the divider wall at least partially define a first flow passage that extends between the passage outlet and the first outlet.

In addition to one or more of the features described above, or as an alternative to any of the foregoing embodiments, wherein the third wall, the second wall, and the third rail at least partially define a second flow passage that extends between the passage outlet and the second outlet.

Also disclosed is a gas turbine engine having a turbine section that is disposed adjacent to a combustor section. The turbine section includes a turbine vane having a first platform and a second platform, and a cooling arrangement. An airfoil radially extends between first surfaces of the first platform and the second platform. The airfoil defines a passage outlet that extends through a second surface of at least one of the first platform and the second platform. The cooling arrangement includes a first wall, a second wall, and a third wall. The first wall disposed on the second surface. The second wall disposed on the second surface. The third wall connected to at least one of the first platform and the second platform, the third wall defines a first outlet and a second outlet.

In addition to one or more of the features described above, or as an alternative to any of the foregoing embodiments, the turbine section includes a first turbine blade extending from a first disk; and a second turbine blade extending from a second disk. The turbine vane is axially disposed between the first turbine blade and the second turbine blade such that a rotor cavity is defined between the turbine vane, the first disk, and the second disk.

In addition to one or more of the features described above, or as an alternative to any of the foregoing embodiments, the cooling arrangement includes a divider wall that is disposed on the second surface and extends between a first platform end and a second platform end; and a rail disposed on the second surface and is disposed parallel to the divider wall.

In addition to one or more of the features described above, or as an alternative to any of the foregoing embodiments, the third wall, the first wall, and the divider wall at least partially define a first flow passage that extends between the passage outlet and the first outlet that discharges into the rotor cavity.

In addition to one or more of the features described above, or as an alternative to any of the foregoing embodiments, the third wall, the second wall, and the rail at least partially define a second flow passage that extends between the passage outlet and the second outlet that discharges into the rotor cavity.

BRIEF DESCRIPTION OF THE DRAWINGS

The following descriptions should not be considered limiting in any way. With reference to the accompanying drawings, like elements are numbered alike:

FIGS. 3A and 3B are partial views of a portion of a turbine vane of the turbine section illustrating a cooling arrangement;

DETAILED DESCRIPTION

A detailed description of one or more embodiments of the disclosed apparatus and method are presented herein by way of exemplification and not limitation with reference to the Figures.

Figure 1:
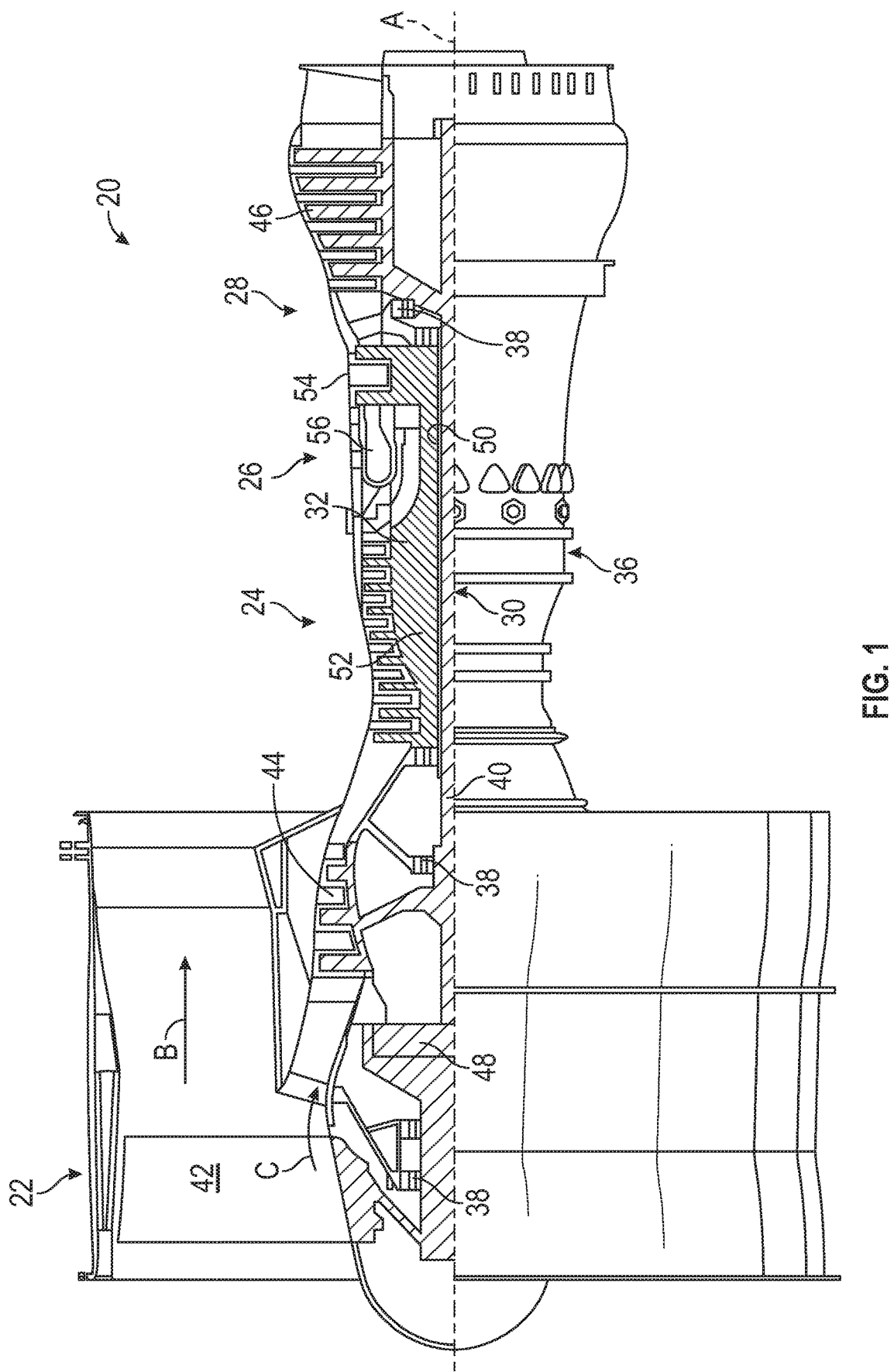
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
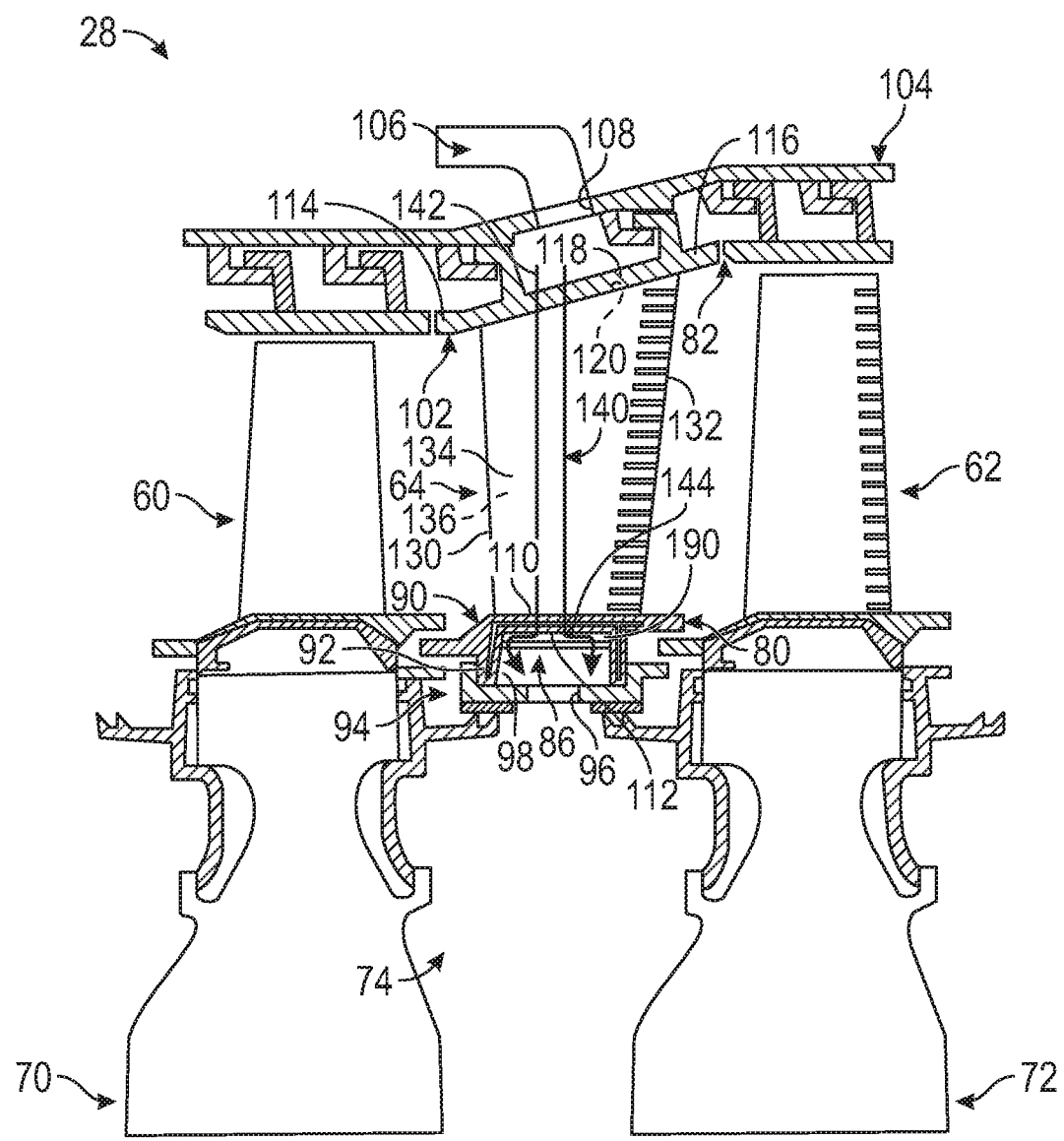
FIG. 2 is a partial cross-sectional view of a turbine section of the gas turbine engine.

FIG. 2 is a schematic view of a portion of the turbine section 28 that may employ various embodiments disclosed herein. The turbine section 28 includes a first blade 60, a second blade 62, and a vane 64. The first blade 60 or the second blade 62 may be turbine blades, rotor blades, or other bladed members provided with the gas turbine engine 20.

The first blade 60 radially extends from a first disk 70 relative to the central longitudinal axis A. In at least one embodiment, the first blade 60 may be integrally formed with the first disk 70. The second blade 62 is axially spaced apart from the first blade 60 along the central longitudinal axis A. The second blade 62 radially extends from a second disk 72 relative to the central longitudinal axis A. In at least one embodiment, the second blade 62 may be integrally formed with the second disk 72.

The vane 64 is axially disposed between the first blade 60 and the second blade 62. The vane 64 may be a turbine vane, a rotor vane, or other vane provided with the gas turbine engine 20. A rotor cavity 74 is defined between the vane 64, the first disk 70, and the second disk 72. The rotor cavity 74 may be fluidly connected to downstream components such as another stage of the turbine section.

The vane 64 includes a first platform 80, a second platform 82, an airfoil 84, and a cooling arrangement 86. The vane 64 may be arranged as a singlet vane, a doublet vane, triplet vane, or other vane configuration.

The first platform 80 may be an inner platform that is disposed proximate an inner diameter 90 of the vane 64. The first platform 80 includes at least one radially inwardly extending forward rail 92 that extends towards the engine central longitudinal axis A. The radially inwardly extending forward rail 92 extends from the first platform 80 and connects the vane 64 to an inner sealing member 94. The inner sealing member 94 defines an opening or an orifice 96 that fluidly connects a flow area 98 bounded by the first platform 80, the radially inwardly extending forward rail 92, and the inner sealing member 94 with the rotor cavity 74.

The second platform 82 may be an outer platform that is disposed proximate an outer diameter 102 of the vane 64. The second platform 82 is disposed proximate and is operatively connected to a case 104 that may be at least partially disposed about the turbine section 28. A duct or a pipe 106 is fluidly connected to an opening 108 that is defined by the case 104. The duct or the pipe 106 is arranged to provide local cooling air to the vane 64 through the opening 108. The local cooling air may be directed towards and through the orifice 96 of the inner sealing member 94.

At least one of the first platform 80 and the second platform 82 includes a first surface 110 and a second surface 112 that is disposed opposite the first surface 110. The first surface 110 may be a hot side of the platform that is exposed to the gas path. The second surface 112 may a cold side of the platform that is not exposed to the gas path.

The first surface 110 and the second surface 112 each axially extend between a first platform end 114 and a second platform end 116. The first surface 110 and the second surface 112 each circumferentially extend between a first platform side 118 and a second platform side 120, as shown in FIGS. 3A, 3B, 4A, 4B, 5A, and 5B.

A first lip 122 is defined by or defined proximate the first platform end 114. The first lip 122 circumferentially extends between the first platform side 118 and the second platform side 120. A second lip 124 is defined by or defined proximate the second platform end 116. The second lip 124 circumferentially extends between the first platform side 118 and the second platform side 120.

A plurality of film cooling holes 126 may be defined by at least one of the first platform 80 and the second platform 82, as shown in FIG. 3A. The plurality of film cooling holes 126 extend from the second surface 112 to the first surface 110. The diameter of the plurality of film cooling holes 126 may be sized based on various flow requirements The airfoil 84 radially extends between the first surfaces 110 of the first platform 80 and the second platform 82 to join the first platform 80 to the second platform 82. The airfoil 84 includes a leading edge 130, a trailing edge 132 disposed opposite the leading edge 130, a pressure side 134 axially extending between the leading edge 130 and the trailing edge 132, and a suction side 136 disposed opposite the pressure side 134 and axially extending between the leading edge 130 and the trailing edge 132.

The airfoil 84 defines a flow passage 140 that extends between and through the first platform 80 and the second platform 82. The flow passage 140 extends between the inner diameter 90 and the outer diameter 102 of the vane 64. In at least one embodiment, the flow passage 140 may be defined by other portions of the vane 64

The airfoil 84 defines a passage inlet 142 and a passage outlet 144 that are both fluidly connected to the flow passage 140. The passage inlet 142 may extend through the first surface 110 and the second surface 112 of the second platform 82. The passage inlet 142 is arranged to receive the local cooling air that flows through the duct or pipe 106 and directs the local cooling air into the flow passage 140. The passage outlet 144 may extend through the first surface 110 and the second surface 112 of the first platform 80. The passage outlet 144 is arranged to direct the local cooling air that flows through the flow passage 140 of the airfoil 84 and into the cooling arrangement 86.

The cooling arrangement 86 is disposed proximate the second surface 112 of at least one of the first platform 80 and the second platform 82. In the embodiment shown, the cooling arrangement 86 is disposed proximate the second surface 112 of the first platform 80. The cooling arrangement 86 is axially disposed between the radially extending forward rail 92 and is radially disposed between the second surface 112 of the first platform 80 and the inner sealing member 94. The cooling arrangement 86 may be integrally formed with the vane 64 or may be provided as a separate component that is disposed on or attached to the vane 64.

Referring to FIGS. 3A, 4A, 5A, and 5B, rails, such as mounting rails, maybe disposed on or extend from the second surface 112 of at least one of the first platform 80 and the second platform 82. The rails may bound the plurality of film cooling holes 126 such that all of the plurality of film cooling holes 126 are disposed within the rails. The rails include a first rail 150, a second rail 152, a third rail 154, and a fourth rail 156. The first rail 150 is disposed proximate the first platform end 114 and is spaced apart from the first platform end 114 by the first lip 122. The second rail 152 is disposed proximate the second platform end 116 and is spaced apart from the second platform end 116 by the second lip 124. The third rail 154 is disposed proximate the first platform side 118 and axially extends between the first rail 150 and the second rail 152. The third rail 154 abuts ends of the first rail 150 and the second rail 152. The fourth rail 156 is disposed proximate the second platform side 120 and axially extends between the first rail 150 and the second rail 152. The fourth rail 156 abuts ends of the first rail 150 and the second rail 152. The first rail 150 and the second rail 152 each circumferentially extends between the third rail 154 and the fourth rail 156.

Referring to FIGS. 3A, 3B, 4A, and 4B, the cooling arrangement 86 includes a first wall 160, a second wall 162, a divider wall 164, and a third wall or a cover plate 166.

The first wall 160 is disposed on the second surface 112. The first wall 160 may be disposed proximate the pressure side 134 or the suction side 136 of the airfoil 84. In the illustrated embodiment, the first wall 160 is disposed proximate the pressure side 134 of the airfoil 84. The first wall 160 may include a first wall first portion 170 that axially extends from a portion of the pressure side 134 of the airfoil 84 that is spaced apart from the leading edge 130 towards the trailing edge 132 of the airfoil 84. The first wall 160 may include a first wall second portion 172 that extends from the first wall first portion 170. The first wall second portion 172 may engage the trailing edge 132 and axially extend towards the second platform end 116 and engages the second rail 152.

The second wall 162 is disposed on the second surface 112 and is spaced apart from the first wall 160. The second wall 162 may be disposed proximate the suction side 136 of the airfoil 84. The second wall 162 may include a second wall first portion 180, a second wall second portion 182, and a second wall third portion 184. The second wall first portion 180 engages the first rail 150 and axially extends towards the leading edge 130 of the airfoil 84. The second wall first portion 180 engages the leading edge 130 of the airfoil 84. The second wall second portion 182 extends from the second wall first portion 180 and engages the suction side 136 of the airfoil 84. The second wall second portion 182 axially extends from the leading edge 130 of the airfoil 84 towards the trailing edge 132 of the airfoil 84. The second wall third portion 184 axially extends from the second wall second portion 182 and extends towards and is spaced apart from the second rail 152. The second wall third portion 184 is spaced apart from the suction side 136 of the airfoil 84.

The divider wall 164 is disposed on the second surface 112. The divider wall 164 axially extends between the first platform end 114 and the second platform end 116. The divider wall 164 engages the first rail 150 and the second rail 152. The divider wall 164 is arranged such that the second wall 162 is circumferentially disposed between the first wall 160 and the divider wall 164.

The cover plate 166 may be spaced apart from the second surface 112 and may be disposed on or operatively connected to at least one of the first rail 150, the second rail 152, the third rail 154, and the fourth rail 156. At least one of the first rail 150, the second rail 152, the third rail 154, and the fourth rail 156 spaces the cover plate 166 apart from at least one of the first wall 160, the second wall 162, and the divider wall 164. A flow cavity 190 is defined between the cover plate 166 and the second surface 112, as shown in FIG. 2. The flow cavity 190 may feed at least a portion of the plurality of film cooling holes 126.

The cover plate 166 defines a first outlet 200 and a second outlet 202 that is spaced apart from the first outlet 200. The first outlet 200 and the second outlet 202 extend completely through the cover plate 166.

The first outlet 200 is disposed proximate the first rail 150, the first lip 122, or the first platform end 114. The second outlet 202 is disposed proximate the second rail 152, the second lip 124, or the second platform end 116.

Figure 4A:
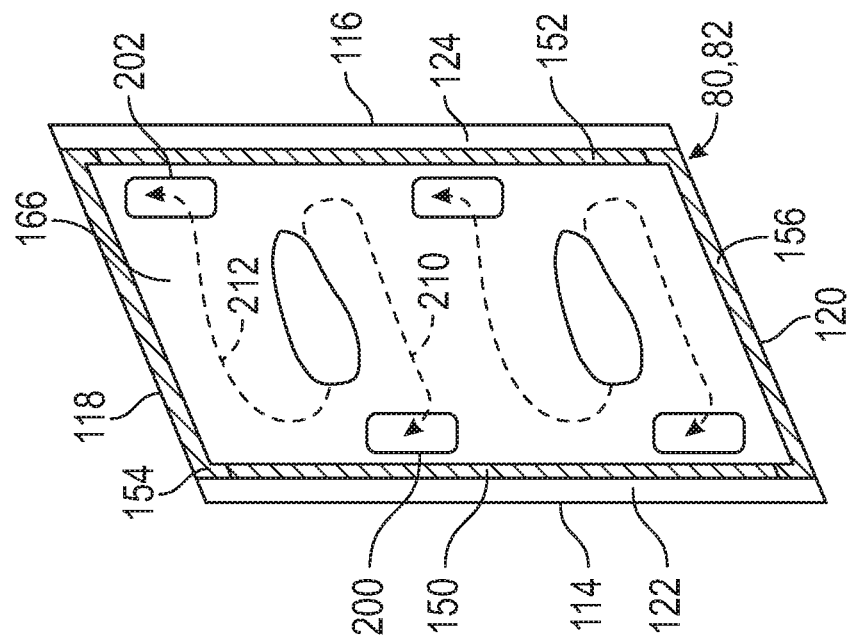
FIGS. 4A and 4B are partial views of the portion of the turbine vane of the turbine section directing cooling flow through the cooling arrangement.
Figure 4B:
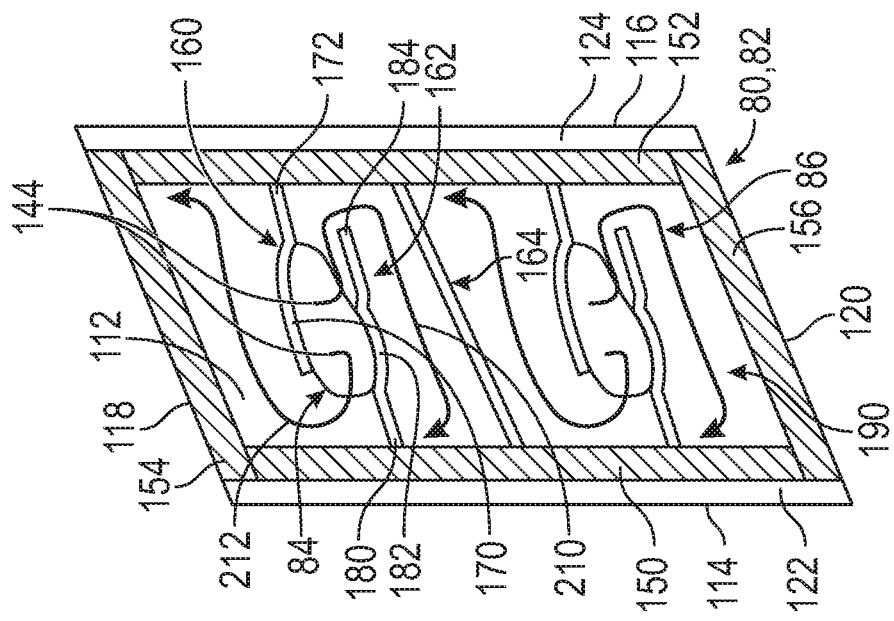

A first flow passage 210 extends between the passage outlet 144 of the airfoil 84 and the first outlet 200 of the cover plate 166. The first flow passage 210 extends through or is defined within the flow cavity 190. The first flow passage 210 may be defined between the cover plate 166, the divider wall 164, and at least one of the first wall 160 and the second wall 162. The first flow passage 210 is defined between the second wall 162 and the divider wall 164, as shown in FIGS. 3A, 4A, and 4B. Airflow that flows through the first flow passage 210 exits through the first outlet 200 and is discharged into the rotor cavity 74 that is not in the gas path of the turbine. The airflow discharged into the rotor cavity 74 is arranged to cool disks, blades, turbine components or other components.

A second flow passage 212 extends between the passage outlet 144 of the airfoil 84 and the second outlet 202 of the cover plate 166. The second flow passage 212 extends through or is defined within the flow cavity 190. The second flow passage 212 may be defined between the cover plate 166, the first wall 160, and the third rail 154, as shown in FIGS. 3A, 4A, and 4B. Airflow that flows through the second flow passage 212 exits through the second outlet 202 and is discharged into the rotor cavity 74 that is not in the gas path of the turbine.

The local cooling air that flows through the airfoil 84 via the flow passage 140 enters into the cooling arrangement 86 and cools at least one of the first platform 80 and the second platform 82, such that the life of the vane 64 is improved due to reduced local temperatures. Furthermore, the cooling arrangement 86 may also enable the gas path temperature to be increased without significant part deficit.

Figure 5A:
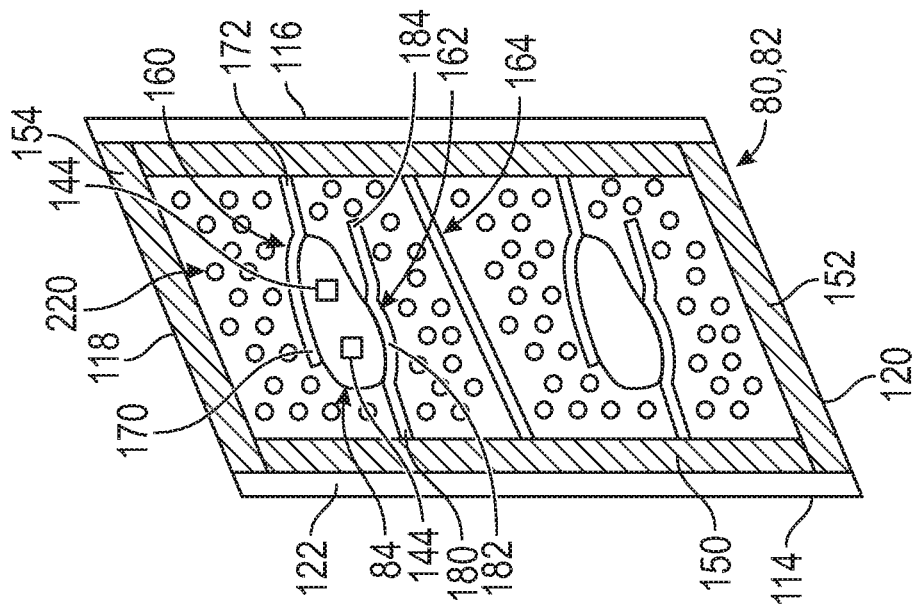
FIGS. 5A and 5B are partial views of the portion of the turbine vane of the turbine section illustrating heat transfer enhancement features of the cooling arrangement.
Figure 5B:
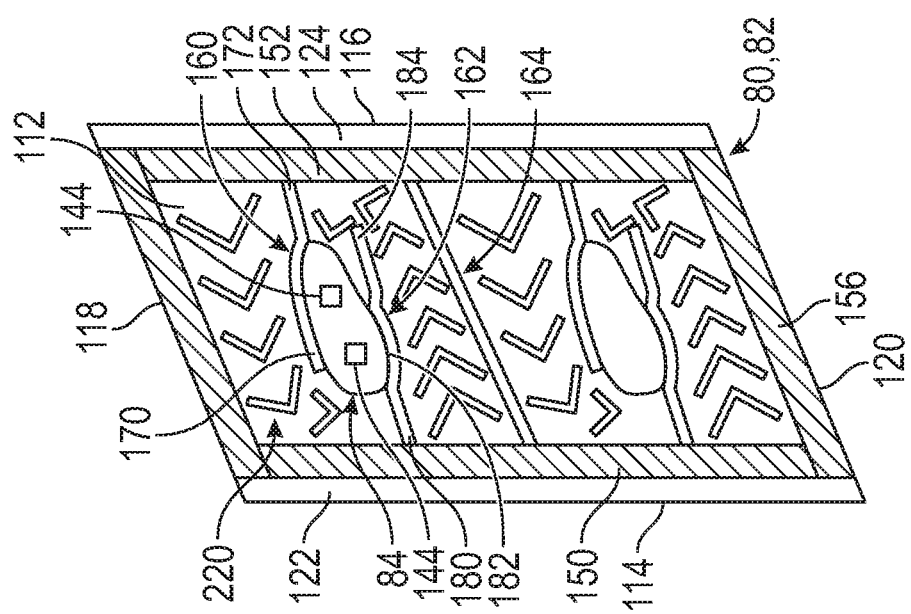

Referring to FIGS. 5A and 5B, heat transfer enhancement features 220 may be disposed on at least one of the first surface 110 or the second surface 112. In other embodiments, the heat transfer enhancement features 220 may be disposed on the first wall 160, the second wall 162, the divider wall 164, and/or a surface of the cover plate 166 that faces towards the second surface 112. The heat transfer enhancement features 220 may be trip strips having a chevron or a non-chevron shape, as shown in FIG. 5A. The heat transfer enhancement features 220 may be arranged as pedestals, honeycombs, surface features such as bumps, or the like, as shown in FIG. 5B.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane for a gas turbine engine, comprising:
    a first platform and a second platform joined together by an airfoil, the airfoil defining a flow passage that extends between the first platform and the second platform, at least one of the first platform and the second platform includes a first rail disposed proximate to a first platform end, a second rail disposed proximate to a second platform end, the first rail being opposite the second rail, a first surface and a second surface that is disposed opposite the first surface, the flow passage defining a passage outlet that extends through the second surface; and a cooling arrangement, comprising:

a first wall disposed on the second surface and extending radially from the second surface, the first wall having a first wall first portion that axially extends from a portion of a pressure side of the airfoil, a first wall second portion that extends from the first wall first portion and engages a trailing edge of the airfoil, and the first wall second portion engages the second rail, a second wall disposed on the second surface, the second wall being spaced apart from the first wall, the second wall extending radially from the second surface, the second wall having a second wall first portion, a second wall second portion, and a second wall third portion, the second wall first portion engages the first rail and extends toward and engages a leading edge of the airfoil, the second wall second portion extends from the second wall first portion and engages a suction side of the airfoil, and the second wall third portion extends from the second wall second portion and is spaced apart from the second rail, a third wall connected to the first wall and the second wall to define a flow cavity therebetween, the third wall being in a facing spaced relationship with respect to the second surface and the third wall defining a first outlet; the third wall, the first wall, and the second wall at least partially define a first flow passage that extends between the passage outlet and the first outlet, wherein a portion of the first flow passage extends between the first wall first portion, the first wall second portion and the second wall first portion, the second wall second portion, and the second wall third portion, and a plurality of heat transfer features extending from the second surface.

2. The vane of claim 1, wherein an airflow flows through the flow passage of the airfoil, enters the first flow passage, and exits through the first outlet.

3. The vane of claim 1, wherein the third wall is integrally formed with at least one of the first platform and the second platform.

4. The vane of claim 1, wherein the third wall defines a second outlet.

5. The vane of claim 1, wherein a plurality of film cooling holes extend from the second surface to the first surface.

6. The vane of claim 5, wherein the plurality of film cooling holes are fed by the flow cavity.

7. The vane of claim 4, wherein the third wall, the first wall, and the second rail at least partially define a second flow passage that extends between the passage outlet and the second outlet.

8. The vane of claim 1, wherein the plurality of heat transfer features are trip strips.

9. The vane of claim 1, wherein the plurality of heat transfer features are pedestals or bumps.

10. A vane for a gas turbine engine, comprising:

a platform having a first surface and a second surface, the first surface and the second surface each axially extend between a first platform end and a second platform end and each circumferentially extend between a first platform side and a second platform side, the first platform having a first rail disposed proximate to the first platform end, a second rail disposed proximate to the second platform end, the first rail being opposite the second rail;

an airfoil connected to the platform, the airfoil defining a passage outlet that extends through the second surface; and a cooling arrangement, comprising:

a first wall disposed on the second surface and disposed proximate a pressure side of the airfoil, the first wall terminating proximate to a leading edge of the airfoil, the first wall having a first wall first portion that axially extends from a portion of the pressure side of the airfoil, a first wall second portion that extends from the first wall first portion and engages a trailing edge of the airfoil, and the first wall second portion engages the second rail, a second wall disposed on the second surface and disposed proximate a suction side of the airfoil, the second wall being spaced apart from the first wall, and the second wall terminating proximate to a trailing edge of the airfoil, the second wall having a second wall first portion, a second wall second portion, and a second wall third portion, the second wall first portion engages the first rail and extends toward and engages a leading edge of the airfoil, the second wall second portion extends from the second wall first portion and engages the suction side of the airfoil, and the second wall third portion extends from the second wall second portion and is spaced apart from the second rail, a third wall connected to the second surface of the platform, the third wall defining a first outlet and a second outlet, the first outlet being located between the second wall and a divider wall that is disposed on the second surface and extends between first platform end and the second platform end, the second outlet being located between the first wall and the second rail that extends from the second surface, the third wall, the first wall, the second wall and the divider wall define a first flow passage between the first wall and the second wall and the first flow passage extends between the trailing edge of the airfoil and the first outlet, and wherein the third wall, the first wall, the second wall and the second rail define a second flow passage between the first wall and the second wall and the second flow passage extends between the leading edge of the airfoil and the second outlet, wherein a portion of the first flow passage and a portion of the second flow passage extends between the first wall first portion, the first wall second portion and the second wall first portion, the second wall second portion, and the second wall third portion.

11. The vane of claim 10, wherein a first flow cavity and a second flow cavity is defined between the third wall and the second surface, the divider wall separating the first flow cavity from the second flow cavity.

12. The vane of claim 11, wherein the third wall is disposed on the first rail and the second rail that extends from the second surface.

13. A gas turbine engine, comprising:

a turbine section disposed adjacent to a combustor section, the turbine section including:

a turbine vane having,
a first platform and a second platform joined together by an airfoil that radially extends between first surfaces of the first platform and the second platform, the airfoil defining a passage outlet that extends through a second surface of at least one of the first platform and the second platform, and at least one of the first platform and the second platform having a first rail disposed proximate to a first platform end, a second rail disposed proximate to a second platform end, the first rail being opposite the second rail, and
a cooling arrangement, comprising:
a first wall disposed on the second surface and extending radially from the second surface, the first wall having a first wall first portion that axially extends from a portion of a pressure side of the airfoil, a first wall second portion that extends from the first wall first portion and engages a trailing edge of the airfoil, and the first wall second portion engages the second rail,
a second wall disposed on the second surface, the second wall being spaced apart from the first wall, the second wall extending radially from the second surface, the second wall having a second wall first portion, a second wall second portion, and a second wall third portion, the second wall first portion engages the first rail and extends toward and engages a leading edge of the airfoil, the second wall second portion extends from the second wall first portion and engages a suction side of the airfoil, and the second wall third portion extends from the second wall second portion and is spaced apart from the second rail,
a third wall connected to at least one of the first platform and the second platform, the third wall being connected to the first wall and the second wall and the third wall is in a facing spaced relationship with respect to the second surface, the third wall defining a first outlet and a second outlet, wherein a first flow passage extends between the first outlet and the second outlet and a portion of the first flow passage extends between the first wall first portion, the first wall second portion and the second wall first portion, the second wall second portion, and the second wall third portion, and
a plurality of trip strips extending from the second surface.

14. The gas turbine engine of claim 13, wherein the turbine section includes:
a first turbine blade extending from a first disk; and
a second turbine blade extending from a second disk, wherein the turbine vane is axially disposed between the first turbine blade and the second turbine blade such that a rotor cavity is defined between the turbine vane, the first disk, and the second disk.

15. The gas turbine engine of claim 14, wherein the cooling arrangement further comprising:
a divider wall that is disposed on the second surface and extends between a first platform end and a second platform end; and
a third rail disposed on the second surface and is disposed parallel to the divider wall.

16. The gas turbine engine of claim 15, wherein the third wall, the first wall, and the divider wall at least partially define a portion of the first flow passage that extends between the passage outlet and the first outlet that discharges into the rotor cavity.

17. The gas turbine engine of claim 16, wherein the third wall, the second wall, and the third rail at least partially define a portion of a second flow passage that extends between the passage outlet and the second outlet that discharges into the rotor cavity.

18. The vane of claim 13, wherein the plurality of trip strips have a chevron shape.

19. The vane of claim 10, wherein a plurality of heat transfer features extend from the second surface.

* * * * *